(12) United States Patent
Omas

(10) Patent No.: US 6,194,939 B1
(45) Date of Patent: Feb. 27, 2001

(54) TIME-WALKING PREVENTION IN A DIGITAL SWITCHING IMPLEMENTATION FOR CLOCK SELECTION

(75) Inventor: Jeremy D. Omas, Sachse, TX (US)

(73) Assignee: Alcatel

( * ) Notice: Subject to any disclaimer, the term of this patent is extended or adjusted under 35 U.S.C. 154(b) by 0 days.

(21) Appl. No.: 09/399,711

(22) Filed: Sep. 21, 1999

(51) Int. Cl.[7] .................................................. G06F 1/04
(52) U.S. Cl. ...................... 327/298; 327/160; 327/162; 327/163; 327/291
(58) Field of Search .................................. 327/291, 298, 327/160, 162, 163

(56) References Cited

U.S. PATENT DOCUMENTS

| | | | |
|---|---|---|---|
| 5,550,860 | * 8/1996 | Georgiou et al. ...................... | 375/220 |
| 5,623,223 | * 4/1997 | Pasqualini ............................... | 327/298 |
| 5,652,536 | * 7/1997 | Nookala et al. ...................... | 327/298 |
| 5,920,600 | * 7/1999 | Yamaoka et al. ...................... | 375/376 |

\* cited by examiner

*Primary Examiner*—Kenneth B. Wells
*Assistant Examiner*—Cassandra Cox

(74) *Attorney, Agent, or Firm*—Gary Cary Ware & Freidenrich LLP

(57) ABSTRACT

A system and method for preventing time-walking in a digital switching network when switching from a first clock to a second clock. The first and second clock can be identical in frequency and independent in phase, where the highest resolution frequency available is that of said first and second clock. The system can include a clock divider selection circuit, an enhanced digital phase aligner, and a clock select control circuit. The clock divider selection circuit can output an on-line divided clock and an off-line clock to the enhanced digital phase aligner. The enhanced digital phase aligner can sample the on-line divided clock with four phases of the off-line clock and output an off-line divided clock which is time shifted such that the off-line divided clock is in phase with the on-line divided clock within plus or minus one-half the clock period of the off-line clock. The clock select control circuit can receive the on-line divided clock from the clock divider selection circuit, the off-line divided clock from the enhanced digital phase aligner and a smoothed clock. When a request is made to switch between clock one and clock two, the clock select control circuit can evaluate the on-line divided clock and the off-line divided clock with the smoothed clock and output a clock select control signal to the clock divider selection circuit based on this comparison.

26 Claims, 7 Drawing Sheets

| FF | DELAY AFTER FF (ns) FROM ONLINE DIVIDED CLOCK INPUT | COUNT STATE (2 DOWN TO 0) | DELAY NEEDED TO ADD (ns) SO THAT THE TOTAL DELAY IS n TIMES THE PERIOD OF THE ONLINE DIVIDED CLOCK (+/− HALF THE PERIOD OF THE OFFLINE CLOCK). SINCE THE ONLINE CLOCK IS A DIVIDE BY 8 OF THE INPUT 155MHz CLOCK, n=48ns |
|---|---|---|---|
| A | 6 | − | |
| C | 6 | − | |
| C0 | 12 | 0000 | 48−12−12−6=18 |
| A0 | 18 | 0001 | 48−18−12−6=12 |
| C1 | 24 | 0010 | 48−24−12−6=6 |
| A1 | 30 | 0011 | 48−30−12−6=0 |
| C2 | 36 | 0100 | 96−36−12−6=42 |
| A2 | 42 | 0101 | 96−42−12−6=36 |
| C3 | 48 | 0110 | 96−48−12−6=30 |
| A3 | 54 | 0111 | 96−54−12−6=24 |
| C4 | 60 | 1000 | 96−60−12−6=18 |
| A4 | 66 | 1001 | 96−66−12−6=12 |
| C5 | 72 | 1010 | 96−72−12−6=6 |
| A5 | 78 | 1011 | 96−78−12−6=0 |
| C6 | 84 | 1100 | 144−84−12−6=42 |
| A6 | 90 | 1101 | 144−90−12−6=36 |
| C7 | 96 | 1110 | 144−96−12−6=30 |
| A7 | 102 | 1111 | 144−102−12−6=24 |
| SELECTED DATA | ADDS 12 ns AS SHOWN IN THE ABOVE EQUATIONS | | |
| OFFLINE DIVIDE CLOCK | ADDS 6 ns AS SHOWN IN THE ABOVE EQUATIONS | | |

*FIG. 8*

TIME-WALKING PREVENTION IN A DIGITAL SWITCHING IMPLEMENTATION FOR CLOCK SELECTION

TECHNICAL FIELD OF THE INVENTION

The present invention relates generally to digital switching networks. More particularly, the present invention relates to a system and method for preventing time-walking when switching between redundant clocks in a digital switching network.

BACKGROUND OF THE INVENTION

In a digital switching network, a system clock can be used to drive multiple modules. The system clock can also provide a synchronization pulse to each module it drives thus enabling the modules to communicate with each other. If the clock fails for any reason, the digital switching network switches to a redundant clock to avoid any interruption in communication between the modules. However, data can be lost in some digital switching networks due to a scenario called time-walking.

Time-walking can occur if two clocks, independent in phase and fixed to the same frequency, are repeatedly switched to be the selected clock. Time-walking steps the time base of occurrence for the synchronous circuitry within the digital switching network which uses the selected clock. If time-walking is not prevented, it can occur that data will no longer be reliably switched throughout the digital switching network without reconfiguration. An example of the time walking scenario is further explained below in FIGS. 1 through 3.

FIG. 1 shows the block diagram of a prior art digital switching network 100. The prior art digital switching network 100 is comprised of clock one 105, clock two 110, selector circuit A 120, selector circuit B 125, module A 130, module B 135, and module C 140. Selector circuit A 120 and selector circuit B 125 switch between clock one 105 and clock two 110 when either clock fails. For the purpose of this example, module A 130, module B 135, and module C 140 are simple eight (8) state counters that produce a pulse on the eighth state. Module A 130 and module B 135 pass data between each other. Module C 140 provides a steady state reference while selector circuit A 120 and selector circuit B 125 switch between clock one 105 and clock two 110.

In FIG. 1 note that a delay 115 is between clock two 110 and selector circuit A 120. Thus, clock one 105 and clock two 110 at selector circuit A 120 are not in phase. There is no delay between either clock one 105 or clock two 110 and selector circuit B 125. Thus, clock one 105 and clock two 110 at selector circuit B 125 are in phase. Module C 140 is driven only by clock one 105.

FIG. 2 shows the timing diagram at selector circuit A 205, the timing diagram at selector circuit B 210, and the timing diagram at module C 215 under steady state conditions (i.e. no switching between clock one 105 and clock two 110 at selector circuit A 120 or selector circuit B 125). As shown in FIG. 2, clock one 105 and clock two 110 are identical in frequency. Since no switching occurs and clock one 105 is in phase at selector circuit A 120, at selector circuit B 125, and at module C 140, no time-walking will occur. Thus the module A pulse 145, module B pulse 150, and the module C pulse 155 shown in timing diagrams 205, 210, and 215, respectively, all occur at the same time.

FIG. 3 shows the timing diagram at selector circuit A 305, the timing diagram at selector circuit B 310, and the timing diagram at module C 315 where selector circuit A 120 and selector circuit B 125 switch from clock one 105 to clock two 110 and back to clock one 105 again. Again, clock one 105 and clock two 110 are identical in frequency, however, the timing diagram at selector circuit A 305 shows that clock one 105 and clock two 110 are not in phase due to the delay 115. If the selector circuit A 120 does not take into account the phase difference between clock one 105 and clock two 110, the module A pulse 145 will walk in time relative the module B pulse 150 and module C pulse 155 as shown in FIG. 3. This time-walking scenario can cause data passing between module A 130 and module B 135 to be lost. More data will continue to be lost if selector circuit A 120 continues to switch between clock one 105 and clock two 110.

SUMMARY OF THE INVENTION

The present invention provides a system and method that substantially eliminates or reduces disadvantages and problems associated with previously developed systems and methods used for preventing time-walking in a digital switching network. More specifically, the present invention provides a system for preventing time-walking in a digital switching network when switching between redundant clocks identical in frequency and independent in phase, where the highest resolution frequency available in the digital switching network is that of the redundant clocks.

The system for preventing time-walking in a digital switching network includes a clock divider selection circuit, an enhanced digital phase aligner, and a clock select control circuit. The clock divider selection circuit outputs an on-line divided clock and an off-line clock to the enhanced digital phase aligner. The enhanced digital phase aligner can sample the on-line divided clock with four phases of the off-line clock and outputs an off-line divided clock which is time shifted such that the off-line divided clock is in phase with the on-line divided clock within plus or minus one-half the clock period of the off-line clock.

The clock select control circuit receives the on-line divided clock from the clock divider selection circuit, the off-line divided clock from the enhanced digital phase aligner, and a smoothed clock. When a request is made to switch between a first clock and a second clock, the clock select control circuit compares the on-line divided clock and the off-line divided clock with the smoothed clock and outputs a clock select control signal to the clock divider selection circuit.

The present invention provides an important technical advantage by providing a system and method for preventing time-walking in a digital switching network when switching between redundant clocks which are identical in frequency but independent in phase.

The present invention provides another technical advantage by providing a more stable environment so customer data can be more reliably switched throughout a digital switching network, thus saving the customer money.

BRIEF DESCRIPTION OF THE DRAWINGS

For a more complete understanding of the present invention and the advantages thereof, reference is now made to the following description taken in conjunction with the accompanying drawings in which like reference numerals indicate like features and wherein:

FIG. 8 shows a table detailing the amount of time delay in nanoseconds after each flip flop from the on-line divided clock input for the first and second serial registers;

DETAILED DESCRIPTION OF THE INVENTION

Preferred embodiments of the present invention are illustrated in the FIGUREs, like numerals being used to refer to like and corresponding parts of the various drawings.

The present invention provides a system and method for preventing time-walking in a digital switching network when switching from a first clock to a second clock where said first and second clock are identical in frequency, independent in phase, and the highest resolution frequency available is that of said first and second clock. The present invention can include a clock divider selection circuit, an enhanced digital phase aligner, and a clock select control circuit. The system for preventing time-walking in a digital switching network includes a clock divider selection circuit, an enhanced digital phase aligner, and a clock select control circuit. The clock divider selection circuit outputs an on-line divided clock and an off-line clock to the enhanced digital phase aligner.

Figure 1:
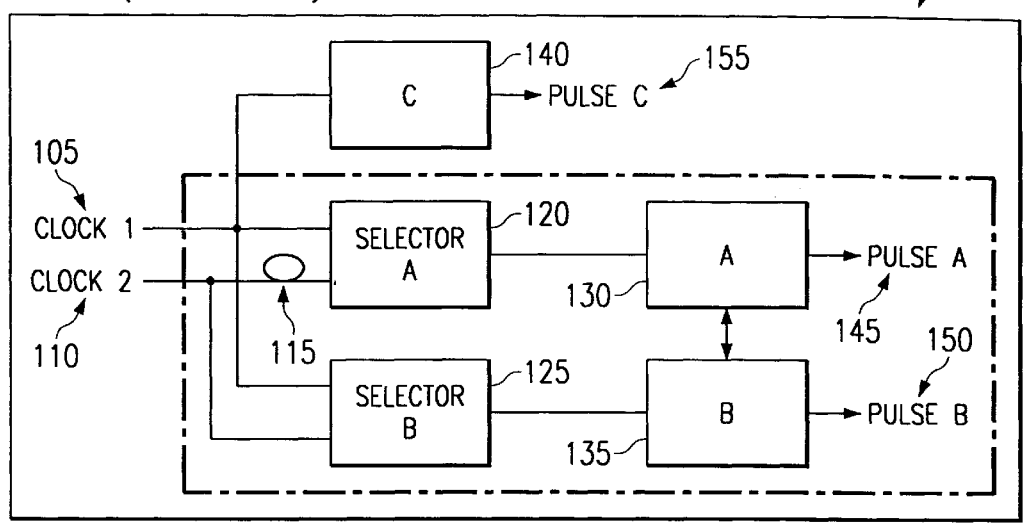
FIG. 1 shows the block diagram of a prior art digital switching network.
Figure 2:
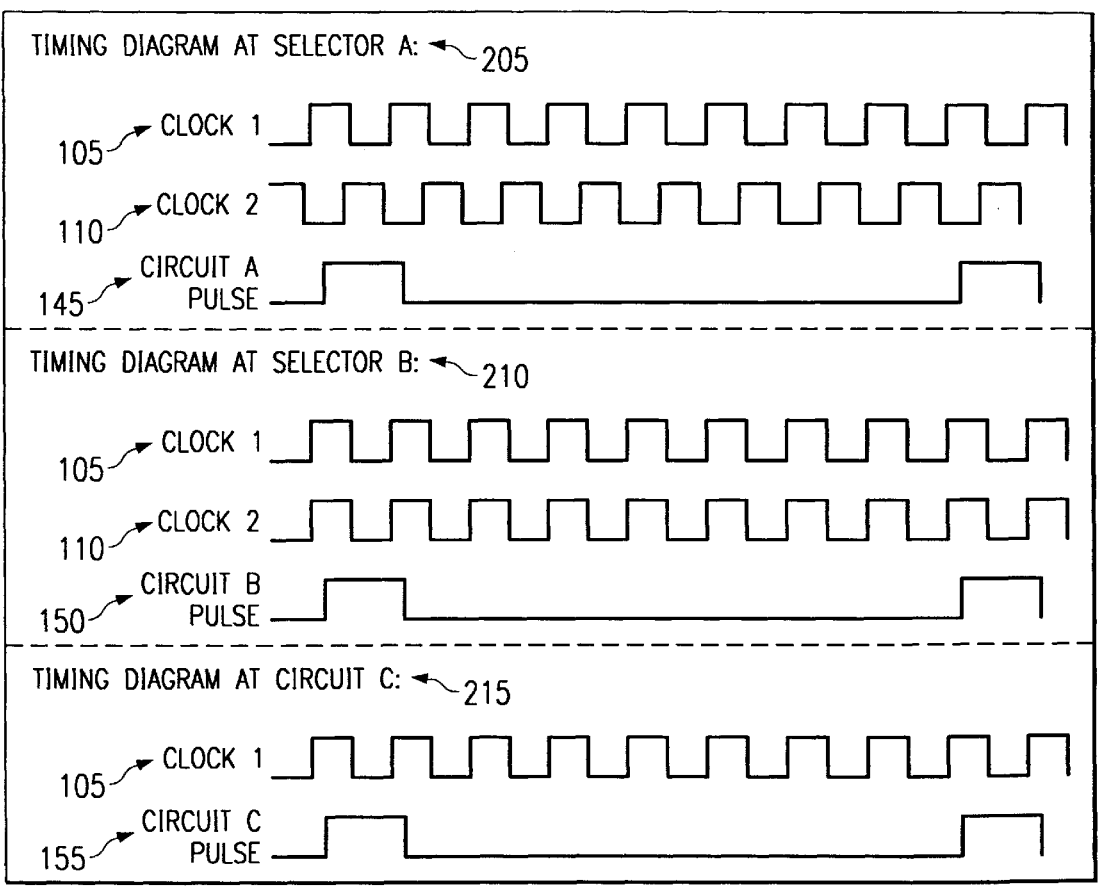
FIG. 2 shows the timing diagram at selector circuit A, the timing diagram at selector circuit B, and the timing diagram at module C under steady state conditions.
Figure 3:
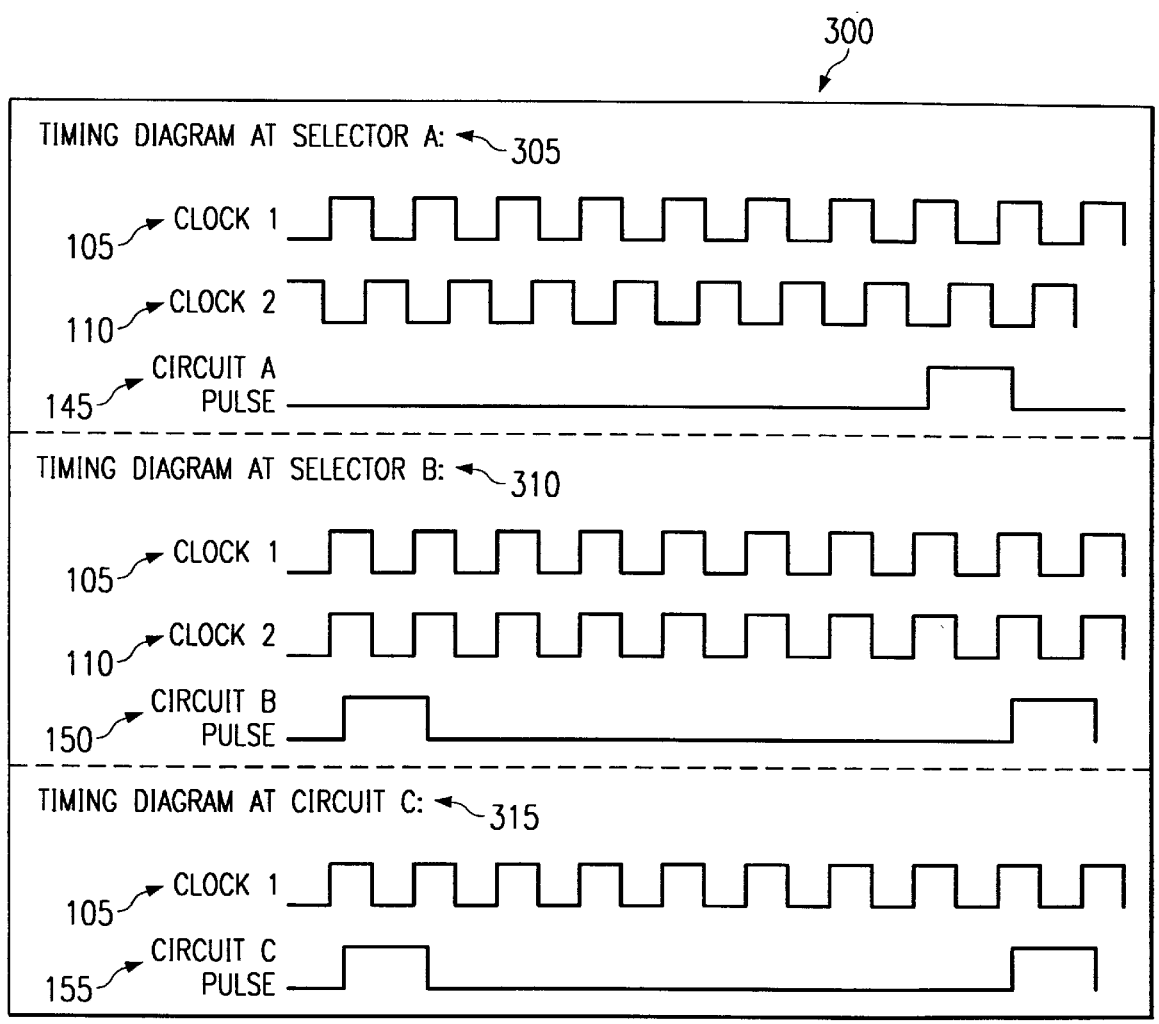
FIG. 3 shows the timing diagram at selector circuit A, the timing diagram at selector circuit B, and the timing diagram at module C where selector circuit A and selector circuit B switch from clock one to clock two and back to clock one again.
Figure 4:
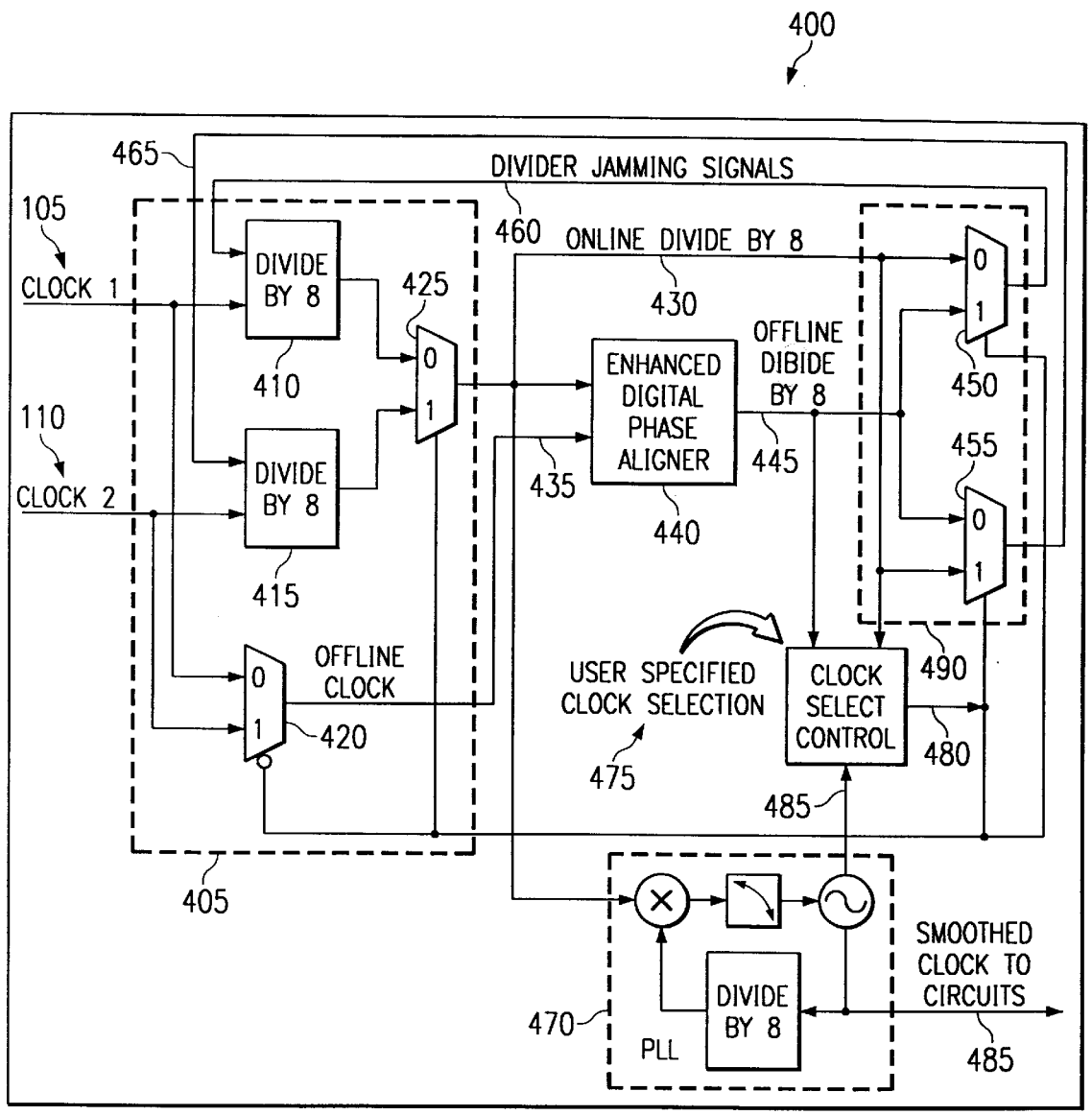
FIG. 4 shows one example of a circuit which prevents time-walking in a digital switching network during clock selection according to the present invention.

The enhanced digital phase aligner samples the on-line divided clock with four phases of the off-line clock and outputs an off-line divided clock which is time shifted such that the off-line divided clock is in phase with the on-line divided clock within plus or minus one-half the clock period of the off-line clock. The clock select control circuit receives the on-line divided clock from the clock divider selection circuit, the off-line divided clock from the enhanced digital phase aligner, and a smoothed clock. When a request is made to switch between a first clock and a second clock, the clock select control circuit compares the on-line divided clock and the off-line divided clock with the smoothed clock and outputs a clock select control signal to the clock divider selection circuit. FIG. 4 shows one example of a circuit which prevents time-walking in a digital switching network during clock selection according to the present invention 400. The time-walking prevention circuit 400 includes a clock divider selection circuit 405, an enhanced digital phase aligner 440, a phase lock loop 470, a clock select control circuit 475, and a clock divider jamming circuit 490.

The clock divider selection circuit 405 includes a first clock divider circuit 410, a second clock divider circuit 415, a first multiplexer 420, and a second multiplexer 425. The clock divider jamming circuit 490 includes a third multiplexer 450 and a fourth multiplexer 455. For the purpose of this example, the first and second clock divider circuits 410 and 415, respectively, are divide by eight (8) divider circuits, however, other sized divider circuits may be used. Also, for the purpose of this example, the first, second, third and fourth multiplexers 420, 425, 450, and 455, respectively, are 2:1 multiplexers, however, other sizes may be used.

The clock divider selection circuit 405 receives a first clock 105 and a second clock 110 which are out of phase with respect to one another. The first clock 105 is input into the first clock divider circuit 410 and immediately gets divided by eight (8). The second clock 110 is input into the second clock divider circuit 415 and immediately gets divided by eight (8). Once the first clock 105 and the second clock 110 are divided by eight (8), they are both input into the second multiplexer 425. The first clock 105 and the second clock 110 also are input into the first multiplexer 420. The first multiplexer 420 and the second multiplexer 425 receive a clock select control signal 480 from the clock select control circuit 475. The first multiplexer 420 outputs either the first clock 105 or the second clock 110 to the enhanced digital phase aligner 440 as the off-line clock 435 based on the clock select control signal 480. Similarly, the second multiplexer 425 outputs either the divided first clock or the divided second clock to the enhanced digital phase aligner 440 as the on-line divided clock 430 based on the clock select control signal 480. For the purpose of this example, assume that the divided first clock is selected as the on-line divided clock 430 and the second clock 110 is selected as the off-line clock 435.

Since the first clock 105 and the second clock 110 are out of phase, the purpose of the enhanced digital phase aligner 440 is to pass the on-line divided clock 430 to the off-line regime. Thus the enhanced digital phase aligner 440 receives the on-line divided clock 430 from the clock divider selection circuit 405, receives the off-line clock 435 from the clock divider selection circuit 405, and outputs an off-line divided clock 445 which is time shifted such that the off-line divided clock 445 is in phase with the on-line divided clock 430 within plus or minus one-half the clock period of the off-line clock 420.

Once the off-line divided clock 445 is output from the enhanced digital phase aligner 440, it is input into the clock select control circuit 475. The clock select control circuit 475 also receives the on-line divided clock 430 from the clock divider selection circuit 405 and a smoothed clock 485 from the phase lock loop 470. Once a request is made to switch between the first clock 105 and the second clock 110, the clock select control circuit 475 evaluates the on-line divided clock 430 and the off-line divided clock 445 with the smoothed clock 485 and outputs a clock select control signal 480 to the first multiplexer 420 and the second multiplexer 425 in the clock divider selection circuit 405. As stated before, the first multiplexer 420 selects either the first clock 105 or the second clock 110 as the off-line clock 435 based on the clock select control signal 480. Similarly, as stated before, the second multiplexer 425 selects either the first divided clock or the second divided clock as the on-line divided clock 430 based on the clock select control signal 480.

The off-line divided clock 445 is also output to the clock divider jamming circuit 490. The clock divider jamming circuit 490 also receives the on-line divided clock 430 from the clock divider selection circuit 405 and the clock select control signal 480 from the clock select control circuit 475. The clock selection control signal 480, the off-line divided clock 445, and the on-line divided clock 430 are each input into the third multiplexer 450 and the fourth multiplexer 455. The third multiplexer 450 outputs either the on-line divided clock 430 or the off-line divided clock 445 as the first clock divider jamming signal 460 based on the clock select control signal 480. Similarly, the fourth multiplexer 455 outputs either the on-line divided clock 430 or the off-line divided clock 445 as the second clock divider jamming signal 465 based on the clock select control signal 480.

The first clock divider jamming signal 460 is fed back to the first clock divider circuit 410 located in the clock divider selection circuit 405. The second clock divider jamming signal 465 is fed back to the second clock divider circuit 415 located in the clock divider selection circuit 405. The purpose of the first and second clock divider jamming signals 460 and 465, respectively, is to jam the first and second clock divider circuits 410 and 415, respectively so that both the first clock divider circuit 410 and the second clock divider circuit 415 output divided signals that look exactly the same except for the phase shift which is equal to the same phase shift as between the first clock 105 and the second clock 110.

Figure 5:
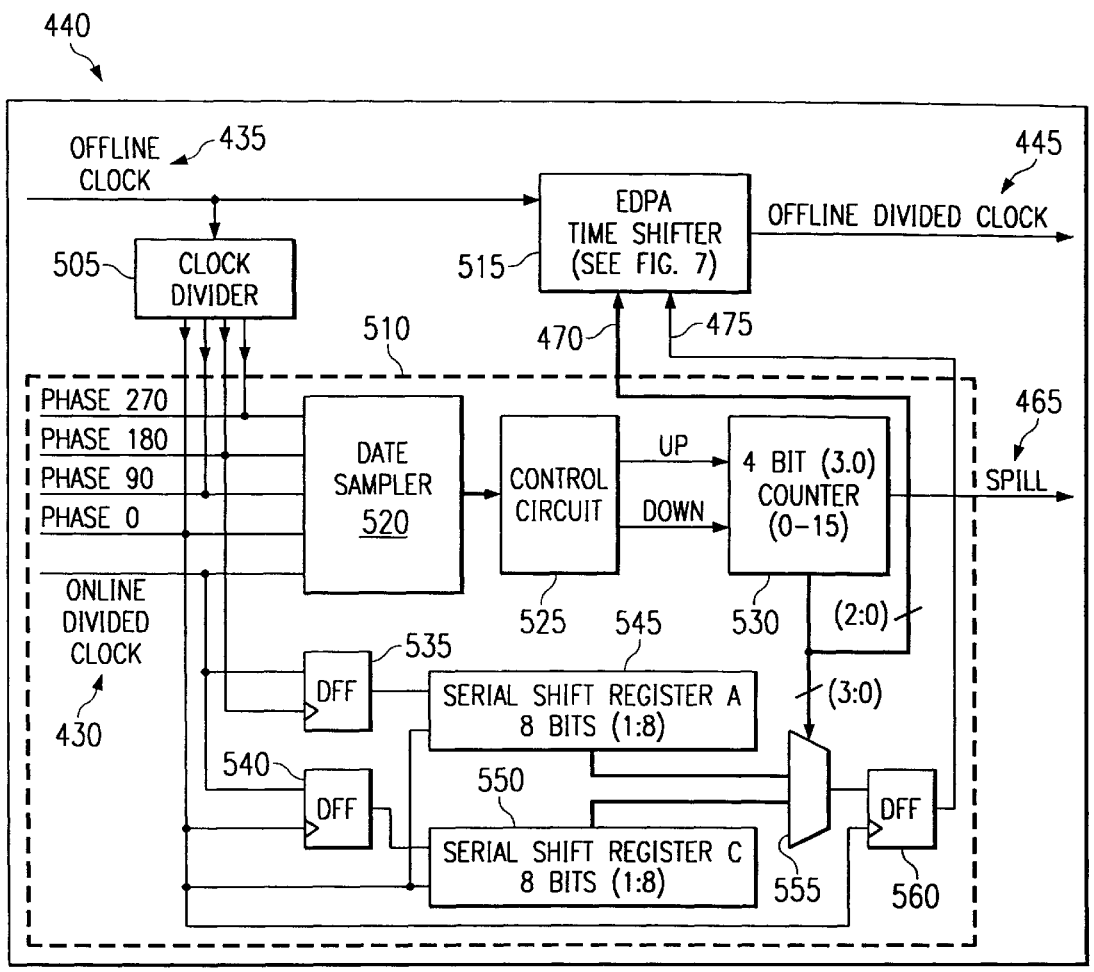
FIG. 5 shows one example of a circuit of the enhanced digital phase aligner according to the present invention.

FIG. 5 shows one example of the circuitry for the enhanced digital phase aligner 440 according to the present invention. The enhanced digital phase aligner 440 includes a clock generator 505, a phase analyzer 510, and a time shifter 515. The phase analyzer 510 includes a data sampler 520, a control circuit 525, a counter 530, a first flip flop 535, a second flip flop 540, a first serial shift register 545, a second serial shift register 550 a fifth multiplexer 555, and a third flip flop 560. For the purpose of this example, the first and second serial shift registers, 545 and 550 are 1:8 serial shift registers, the counter 530 is a four (4) bit counter, and the fifth multiplexer is a 16:1 multiplexer, however, other sizes may be used.

Figure 6:
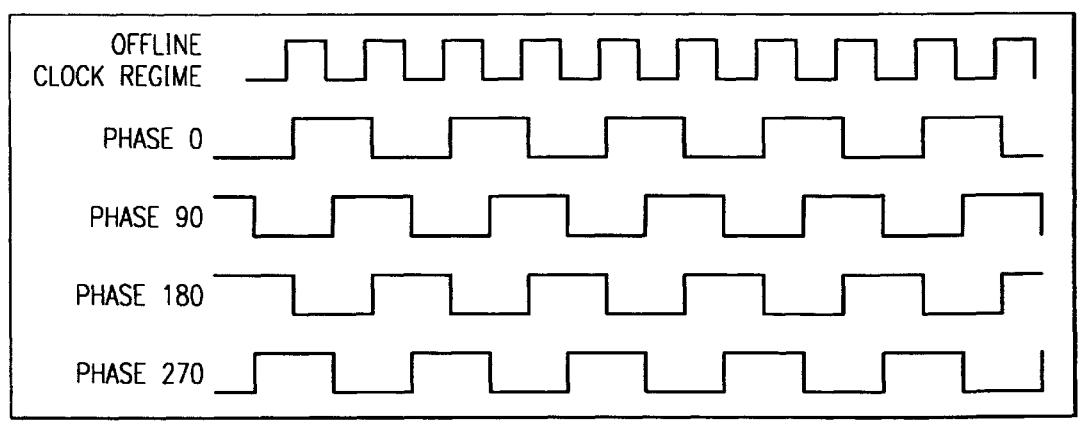
FIG. 6 shows a timing diagram depicting how the clock generator divides the off-line clock into four phases according to the present invention.

The clock generator 505 receives the off-line clock 435 from the said clock divider selection circuit, generates four phases of the off-line clock 435, and inputs the four phases into the phase analyzer 510. For the purpose of this example the four phases produced are 0, 90, 180, and 270 degrees. Other phases may be produced. FIG. 6 shows a timing diagram of the four phases. After entering the phase analyzer 510, the four phases are first received at the data sampler 520. The on-line divided clock 430 is also received at the data sampler 520. The data sampler 520 uses the four phases of the off-line clock 435 to sample the on-line divided clock 430 and outputs multiple data samples of the on-line divided clock 430 to the control circuit 525.

The control circuit 525 analyzes the multiple data samples from the data sampler 520 and selects the phase of the off-line clock which is the furthest from the leading edge of the on-line divided clock 430. When ever the currently selected sample point gets closer than ninety (90) degrees to a data transition, the output sample is changed by one hundred eighty (180) degrees. This is done by sending a signal from the control circuit 525 to the counter 530 which either increments or decrements the counter 530. Once the counter 530 is either incremented or decremented, the counter 530 sends a phase select control signal 470 to the fifth multiplexer 555 which then adjusts the sample one hundred eighty (180) degrees based on the count value. If the count roles over (i.e. 0000 to 1111 or 1111 to 0000), a spill will be indicated by outputting a spill signal 465 from the counter 530. The phase select control signal 470 is also output to the time shifter 515.

Figure 7:
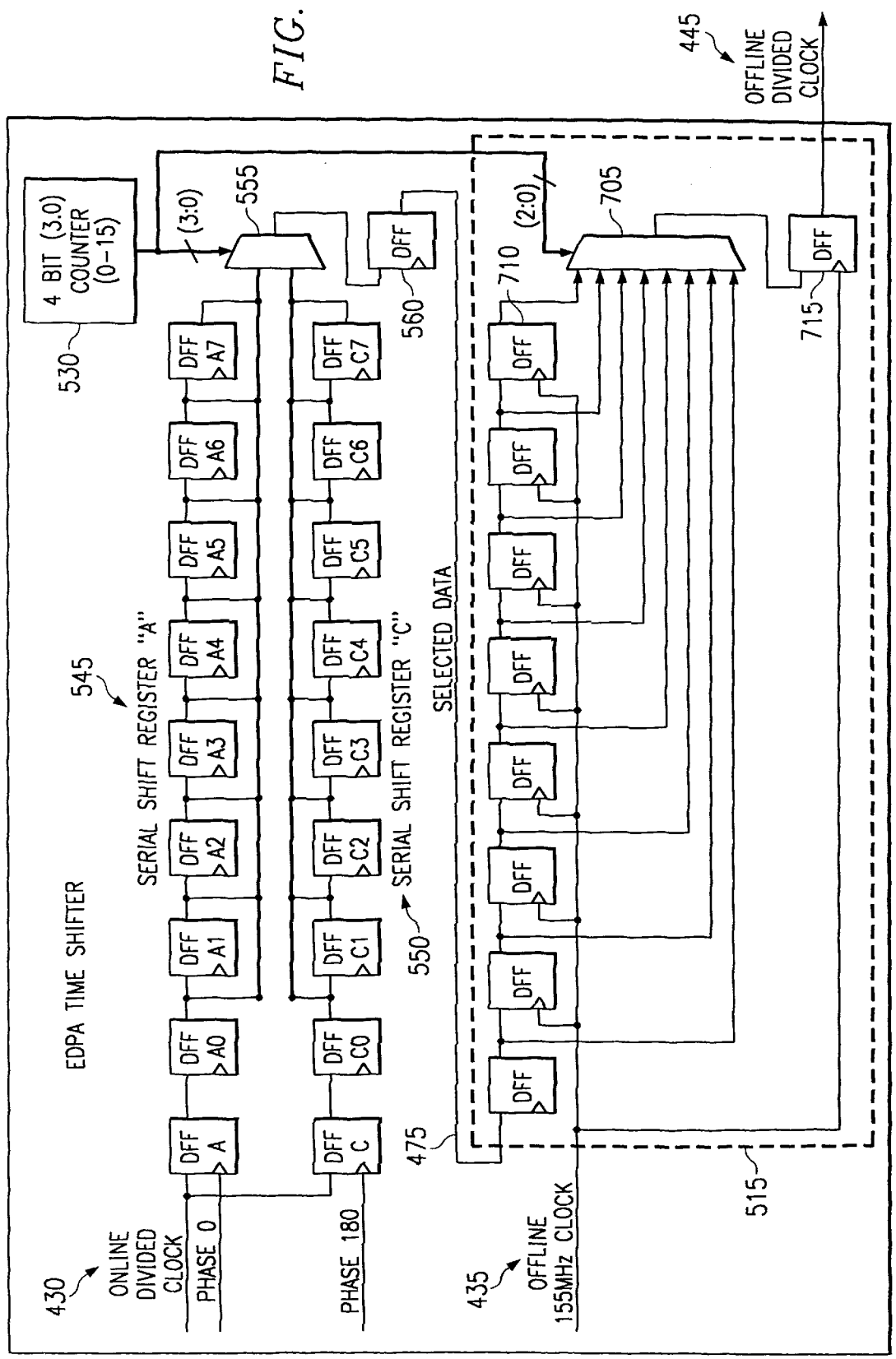
FIG. 7 shows one example of time shifter circuit according to the present invention.

FIG. 7 shows one example of the time shifter 515 circuit according to the present invention. The time shifter 515 includes a multiplexer 705, a tapped shift register 710, and a flip flop 715. The time shifter 515 receives the off-line clock 435 from the clock divider selection circuit 405, the sampled on-line divided clock 475 from the phase analyzer 510 and the phase select control signal 470 from the counter 530. The purpose of time shifter 515 is to time shift the off-line divided clock 445 such that the off-line divided clock 445 is in phase with the on-line divided clock 430 within plus or minus one-half the clock period of the off-line clock 435. The selection on the multiplexer 705 is based upon the count value of the counter 530. That information is carried from the counter 530 to the multiplexer 705 through the phase select control signal 470. The three least significant bits of the count value are used to determine how much delay needs to be added to the sampled on-line divided clock 470 so that the edges of the off-line divided clock 445 are as close as possible to the edges of the on-line divided clock 430.

TABLE 1, also shown in FIG. 8, shows a table that describes how much delay is needed to time shift the sampled on-line divided clock 475.

TABLE 1

| Flip-Flop (FF) | Delay after FF (ns) from online divided clock input | County State (2 down to 0) | Delay Needed to Add (ns) so that the total delay is n times the period of the online divided clock (+/− half the period of the offline clock). Since the online clock is a divide by 8 of the input 155 MHz clock, n = 48 ns. |
|---|---|---|---|
| A | 6 | — | |
| C | 6 | — | |
| C0 | 12 | 0000 | 48 − 12 − 12 − 6 = 18 |
| A0 | 18 | 0001 | 48 − 18 − 12 − 6 = 12 |
| C1 | 24 | 0010 | 48 − 24 − 12 − 6 = 6 |
| A1 | 30 | 0011 | 48 − 30 − 12 − 6 = 0 |
| C2 | 36 | 0100 | 96 − 36 − 12 − 6 = 42 |
| A2 | 42 | 0101 | 96 − 42 − 12 − 6 = 36 |
| C3 | 48 | 0110 | 96 − 48 − 12 − 6 = 30 |
| A3 | 54 | 0111 | 96 − 54 − 12 − 6 = 24 |
| C4 | 60 | 1000 | 96 − 60 − 12 − 6 = 18 |
| A4 | 66 | 1001 | 96 − 36 − 12 − 6 = 42 |
| C5 | 72 | 1010 | 96 − 72 − 12 − 6 = 6 |
| A5 | 78 | 1011 | 96 − 78 − 12 − 6 = 0 |
| C6 | 84 | 1100 | 144 − 84 − 12 − 6 = 42 |
| A6 | 90 | 1101 | 144 − 90 − 12 − 6 = 36 |
| C7 | 96 | 1110 | 144 − 96 − 12 − 6 = 30 |
| A7 | 102 | 1111 | 144 − 102 − 12 − 6 = 24 |
| Selected Data | | Adds 12 ns as shown in the above equations | |
| Offline Divide Clock | | Adds 6 ns as shown in the above equations | |

For example, under the Flip Flop column (FF), there is A and C. If C0 is selected, less than one period will need to be added to the sampled on-line divided clock 475. In the last column, 48 nanoseconds represents the total period. First, the 12 nanoseconds that C0 adds is subtracted, next the 12 nanoseconds that the flip flop 715 adds is subtracted, finally the 6 seconds that flip flop C adds is subtracted. Thus 18 nanoseconds is needed to time shift the off-line divided clock 445 such that the off-line divided clock 445 is in phase with the on-line divided clock 430 within plus or minus one-half the clock period of the off-line clock 435. The tapped shift register 710 will then tap off of the third flip flop in the tapped shift register 710 since each flip flop in the tapped shift register 710 has a delay of 6.

Figure 9:
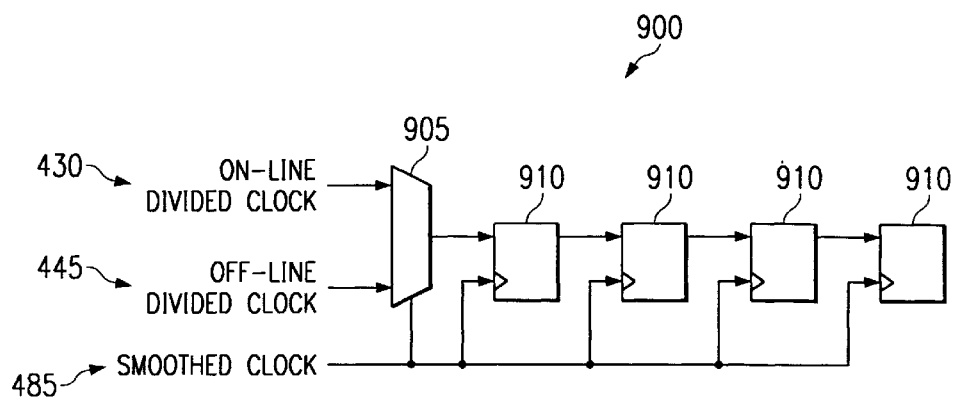
FIG. 9 shows one example of the clock select control circuit according to the present invention.
Figure 10:
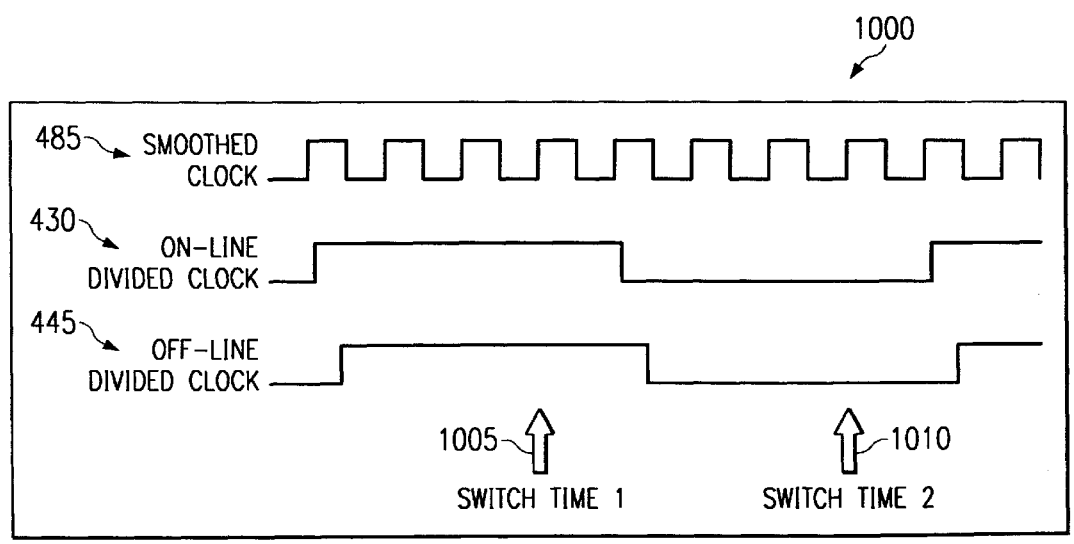
FIG. 10 shows a clock control diagram which details the switch times for the first and second clocks.

FIG. 9 shows one example of the clock select control circuit 475. The clock select control circuit includes a multiplexer 905 and multiple flip flops 910. The on-line divided clock 430 and the off-line divided clock 445 are input into the multiplexer 905. The smoothed clock 485 is input into the multiplexer 905 and in each flip flop 910. FIG. 10 shows a clock control timing diagram 1000 which details the two times when the first clock 105 can switch to the second clock 110 or when the second clock 110 can switch to the first clock 105. When a request is made to switch between the first clock 105 and the second clock 110, the clock select control circuit 475 compares said on-line divided clock and said off-line divided clock to said smoothed clock and determines whether the request falls in either the first switch time 1005 or the second switch time 1010. Next, the clock select control circuit 475 sends out a clock select control signal to the clock divider select circuit and the clock divider jamming circuit.

In summary, the present invention provides a system and method for preventing time-walking in a digital switching network when switching from a first clock to a second clock where said first and second clock are identical in frequency, independent in phase, and the highest resolution frequency available is that of said first and second clock includes a clock divider selection circuit, an enhanced digital phase aligner, and a clock select control circuit. The clock divider selection circuit outputs an on-line divided clock and an off-line clock to the enhanced digital phase aligner. The enhanced digital phase aligner samples the on-line divided clock with four phases of the off-line clock and outputs an off-line divided clock which is time shifted such that the off-line divided clock is in phase with the on-line divided clock within plus or minus one-half the clock period of the off-line clock.

The clock select control circuit receives the on-line divided clock from the clock divider selection circuit, the off-line divided clock from the enhanced digital phase aligner and a smoothed clock. When a request is made to switch between clock one and clock two, the clock select control circuit evaluates the on-line divided clock and the off-line divided clock with the smoothed clock and outputs a clock select control signal to the clock divider selection circuit.

Although the present invention has been described in detail, it should be understood that various changes, substitutions and alterations can be made hereto without departing from the spirit and scope of the invention as described by the appended claims.

What is claimed is:

1. A system for preventing time-walking in a digital switching network when switching from a first clock to a second clock, comprising:
   a clock divider selection circuit operable to output an on-line divided clock and an off-line clock;
   an enhanced digital phase aligner operable to receive said on-line divided clock and said off-line clock from said clock divider selection circuit and output an off-line divided clock which is the off-line clock time shifted such that said off-line divided clock is in phase with said on-line divided clock within plus or minus one-half the clock period of said off-line clock; and
   a clock select control circuit operable to receive said on-line divided clock and said off-line divided clock from said enhanced digital phase aligner, receive a smoothed clock, compare said on-line divided clock and said off-line divided clock to said smoothed clock, and output a clock select control signal to said clock divider selection circuit.

2. The system of claim 1, wherein said first and second clock are identical in frequency, independent in phase, and the highest resolution frequency available is that of said first and second clock.

3. The system of claim 1, wherein said clock select control signal directs said clock divider selection circuit to select either a first clock or a second clock as said off-line clock.

4. The system of claim 1, wherein said clock select control signal directs said clock divider selection circuit to select either a first divided clock or a second divided clock as said on-line divided clock.

5. The system of claim 1, wherein said clock select control circuit chooses between a first and second switch time after comparing said on-line divided clock and said off-line divided clock to said smoothed clock.

6. The system of claim 1, further comprising:
   a phase lock loop operable to receive said on-line divided clock from said clock divider selection circuit and output a smoothed clock to said clock select control circuit and said digital switching network; and
   a clock divider jamming circuit operable to receive said on-line divided clock from said clock divider selection circuit, receive said off-line divided clock from said enhanced digital phase aligner, receive said clock selection control signal from said clock select control circuit, output a first clock divider jamming signal to said clock divider selection circuit, and output a second clock divider jamming signal to said clock divider selection circuit.

7. The system of claim 5, wherein said clock divider selection circuit comprises:
   a first clock divider circuit operable to divide said first clock, receive said first clock divider jamming signal from said clock divider jamming circuit, and output said divided first clock;
   a second clock divider circuit operable to divide said second clock, receive said second clock divider jamming signal from said divider jamming circuit, and output said divided second clock;
   a first multiplexer operable to receive said first clock, said second clock, and said clock select control signal and output either said first clock or said second clock as said off-line clock based on said clock control select signal; and
   a second multiplexer operable to receive said first divided clock, said second divided clock, and said clock control select signal and output either said first divided clock or said second divided clock as said on-line divided clock based on said clock control select signal.

8. The system of claim 1, wherein said enhanced digital phase aligner comprises:
   a clock generator operable to receive said off-line clock from said clock divider selection circuit and generate four phases of said off-line clock;
   a phase analyzer operable to sample said on-line divided clock with said four phases of said off-line clock, select the phase of said off-line clock which is the furthest from the leading edge of said on-line divided clock, output a spill signal, and output a phase select control signal based on the sampling of said on-line divided clock; and
   a time shifter operable to receive said off-line clock from said clock divider selection circuit, receive said sampled on-line divided clock from said phase analyzer, receive said phase select control signal from said phase analyzer, time shift said off-line divided clock such that said off-line divided clock is in phase with said on-line divided clock within plus or minus one-half the clock period of said off-line clock, and output said off-line divided clock.

9. The system of claim 8, wherein said phase analyzer comprises:
- a data sampler operable to sample said on-line divided clock with said four phases of said off-line clock and output multiple data samples of said on-line divided clock;
- a control circuit operable to analyze said multiple samples from said data sampler and select the phase of said off-line clock which is furthest from a leading edge of said on-line divided clock;
- a counter;
- a first serial shift register;
- a second serial shift register;
- a multiplexer; and
- a plurality of flip flops.

10. The system of claim 8, wherein said time shifter comprises a tapped shift register, a flip flop, and a multiplexer.

11. The system of claim 1, wherein said clock select control circuit comprises a mulitplexer and a plurality of flip flops.

12. The system of claim 1, wherein said clock divider selection circuit is further operable to receive a first clock, a second clock, and divide said first and second clocks.

13. The system of claim 8, wherein said four phases of said off-line clock can be equal to zero (0) degrees, ninety (90) degrees, one hundred eighty (180) degrees and two hundred seventy (270) degrees, further wherein each of the four phases are divided by two.

14. A system for preventing time-walking in a digital switching network when switching from a first clock to a second clock where said first and second clock are identical in frequency, independent in phase, and the highest resolution frequency available is that of said first and second clock, comprising:
- a clock divider selection circuit operable to output an on-line divided clock and an off-line clock;
- an enhanced digital phase aligner operable to receive said on-line divided clock and said off-line clock from said clock divider selection circuit and output an off-line divided clock which is the off-line clock time shifted such that said off-line divided clock is in phase with said on-line divided clock within plus or minus one-half the clock period of said off-line clock; and
- a clock select control circuit operable to receive said on-line divided clock and said off-line divided clock from said enhanced digital phase aligner, receive a smoothed clock, compare said on-line divided clock and said off-line divided clock to said smoothed clock, and output a clock select control signal to said clock divider selection circuit;
- a phase lock loop operable to receive said on-line divided clock from said clock divider selection circuit and output a smoothed clock to said clock select control circuit and said digital switching network; and
- a clock divider jamming circuit operable to receive said on-line divided clock from said clock divider selection circuit, receive said off-line divided clock from said enhanced digital phase aligner, receive said clock selection control signal from said clock select control circuit, output a first clock divider jamming signal to said clock divider selection circuit, and output a second clock divider jamming signal to said clock divider selection circuit.

15. A method for preventing time-walking in a digital switching network when switching from a first clock to a second clock where said first and second clock are identical in frequency, independent in phase, and the highest resolution frequency available is that of said first and second clock, comprising the steps of:
- receiving an on-line divided clock and an off-line divided clock at an enhanced digital phase aligner from a clock divider selection circuit;
- outputting an off-line divided clock which is the off-line clock time shifted such that said off-line divided clock is in phase with said on-line divided clock within plus or minus one-half the clock period of said off-line clock from said enhanced digital phase aligner;
- receiving said on-line divided clock at a clock select control circuit from said clock divider selection circuit;
- receiving said off-line divided clock at said clock select control circuit from said enhanced digital phase aligner;
- receiving a smoothed clock at said clock select control circuit;
- evaluating said on-line divided clock and said off-line divided clock with said smoothed clock at said clock select control circuit; and
- outputting a clock select control signal from said clock select control circuit to said clock divider selection circuit.

16. The method of claim 15, wherein said clock select control signal directs said clock divider selection circuit to select either a first clock or a second clock as said off-line clock.

17. The method of claim 15, wherein said clock select control signal directs said clock divider selection circuit to select either a first divided clock or a second divided clock as said on-line divided clock.

18. The method of claim 15, wherein said clock select control circuit chooses between a first and second switch time after comparing said on-line divided clock and said off-line divided clock to said smoothed clock.

19. The method of claim 17, further comprising the steps of:
- receiving said on-line divided clock at a phase lock loop from said clock divider selection circuit; and
- outputting a smoothed clock from said phase lock loop to said clock select control circuit and said digital switching network; and
- receiving said on-line divided clock at a clock divider jamming circuit from said clock divider selection circuit;
- receiving said off-line divided clock at said clock divider jamming circuit from said enhanced digital phase aligner;
- receiving said clock selection control signal at said clock divider jamming circuit from said clock select control circuit;
- outputting a first clock divider jamming signal from said clock divider selection circuit to said clock divider selection circuit; and
- outputting a second clock divider jamming signal from said clock divider selection circuit to said clock divider selection circuit.

20. The method of claim 19, wherein said clock divider selection circuit comprises:
- a first clock divider circuit operable to divide said first clock, receive said first clock divider jamming signal from said clock divider jamming circuit, and output said first divided clock;
- a second clock divider circuit operable to divide said second clock, receive said second clock divider jamming signal from said divider jamming circuit, and output said second divided clock;
- a first multiplexer operable to receive said first clock, said second clock, and said clock select control signal and output either said first clock or said second clock as said off-line clock based on said clock control select signal; and
- a second multiplexer operable to receive said first divided clock, said second divided clock, and said clock control select signal and output either said first divided clock or said second divided clock as said on-line divided clock based on said clock control select signal.

21. The method of claim 15, wherein said enhanced digital phase aligner comprises:
- a clock generator operable to receive said off-line clock from said clock divider selection circuit and generate four phases of said off-line clock;
- a phase analyzer operable to sample said on-line divided clock with said four phases of said off-line clock, select the phase of said off-line clock which is the furthest from the leading edge of said on-line divided clock, output a spill signal, and output a phase select control signal based on the sampling of said on-line divided clock; and
- a time shifter operable to receive said off-line clock from said clock divider selection circuit, receive said sampled on-line divided clock from said phase analyzer, receive said phase select control signal from said phase analyzer, time shift said off-line divided clock such that said off-line divided clock is in phase with said on-line divided clock within plus or minus one-half the clock period of said off-line clock, and output said off-line divided clock.

22. The method of claim 21, wherein said phase analyzer comprises:
- a data sampler operable to sample said on-line divided clock with said four phases of said off-line clock and output multiple data samples of said on-line divided clock;
- a control circuit operable to analyze said multiple samples from said data sampler and select the phase of said off-line clock which is furthest from a leading edge of said on-line divided clock;
- a counter;
- a first serial shift register;
- a second serial shift register;
- a multiplexer; and
- a plurality of flip flops.

23. The method of claim 21, wherein said time shifter comprises a tapped shift register, a flip flop, and a multiplexer.

24. The method of claim 15, wherein said clock select control circuit comprises a mulitplexer and a plurality of flip flops.

25. The method of claim 21, further comprising the step of:
- receiving a first clock, a second clock at said clock divider selection circuit; and
- dividing said first and second clocks.

26. The method of claim 21, wherein said four phases of said off-line clock can be equal to zero (0) degrees, ninety (90) degrees, one hundred eighty (180) degrees and two hundred seventy (270) degrees, further wherein each of the four phases are divided by two.

* * * * *